Patented Aug. 8, 1933

1,921,634

UNITED STATES PATENT OFFICE 1,921,634

PROCESS OF PREPARING HYDRATED CITRIC ACID

Richard Pasternack, Brooklyn, N. Y., Francis L. Mead, Jersey City, N. J., and John L. Davenport, Brooklyn, N. Y., assignors to Charles Pfizer & Company, Brooklyn, N. Y., a Corporation of New Jersey No Drawing. Application July 15, 1931
Serial No. 551,046

9 Claims. (Cl. 260—112)

This invention relates to a process of preparing hydrated citric acid and is a continuation in part of our copending application S. N. 507,300, which relates to a process of preparing anhydrous citric acid by evaporating an aqueous citric solution under an absolute pressure greater than 1¼ inches of mercury.

Heretofore, in preparing hydrated citric acid, it has been customary to evaporate a citric acid solution to about 36° Baumé, and then allow the solution to cool, whereupon hydrated citric acid crystallizes out. This method presents the disadvantage that the cooling and crystallization proceed at a slow rate.

We have found, that upon evaporation of an aqueous citric acid solution under reduced pressure, the citric acid product may be varied by controlling the degree of absolute pressure. At an absolute pressure of greater than 1¼ inches of mercury corresponding to a boiling point of 40° C. or above, depending on the degree of absolute pressure, the sole product of crystallization is anhydrous citric acid, $C_6H_8O_7$. At an absolute pressure below 1¼ inches of mercury upon evaporation directly in a vacuum pan, the sole product of crystallization is hydrated citric acid, $C_6H_8O_7.H_2O$. By direct evaporation is meant that the crystallization occurs in the same vessel, i. e. the vacuum pan, which contains the solution and which is heated. By this method, the necessity of transferring the heated solution to a cooling vessel is dispensed with, thus materially simplifying the handling, reducing the length of time required for the process, and increasing the yield of the product.

We have further found that it is possible to obtain pure hydrated citric acid from a relatively impure aqueous solution of citric acid by this process. Such impurities may be, for instance, soluble carbohydrates, and inorganic acids and salts. Ordinarily such impurities tend to retard crystallization, but, according to this invention, the rate of crystallization is not materially affected by such impurities in the solution.

Example I

A solution of citric acid is evaporated at an absolute pressure of 1½ inches or more corresponding to a boiling point of about 43° C. When the evaporation is continued beyond the saturation point, separation of crystals of anhydrous citric acid begins, remaining as such in suspension in the liquor. When 40-50% of the contained citric acid is separated out, the separation from the mother liquor is effected in the usual manner by centrifugation. The anhydrous crystals are then washed free of mother liquor with a small quantity of water or saturated citric acid solution, and dried to eliminate extraneous moisture. The free flowing shiny product, $C_6H_8O_7$, thus obtained will test not less than 99.0% anhydrous citric acid. The mother liquor can be returned for further crystallization.

Example II

An aqueous citric acid solution is placed in a vacuum pan and directly evaporated at an absolute pressure of about 1 inch or less, corresponding to a temperature of 37° C. or lower in the boiling saturated solution. The crystals are then separated from the mother liquor by any known method. The sole product of crystallization is hydrated citric acid, $C_6H_8O_7.H_2O$. The mother liquor can be reworked until substantially all the contained citric acid has crystallized.

Example III

The method in Example I is repeated, using an impure aqueous solution, containing citric acid and other soluble organic and inorganic substances in the proportion of approximately 15 parts of citric acid to one part of impurities.

By reworking the mother liquor once or twice, about 75% of the citric acid can be obtained in substantially pure form, but the amount of citric acid recoverable from impure solutions varies with the amount of impurities present. If the ratio of citric acid to impurities is about twenty-five to one, 85% of the citric acid may be recovered by crystallization. In general, it is not practicable to recover citric acid by crystallization, if the ratio of citric acid to impurities is much less than four to one. The citric acid remaining in the mother liquor is then recovered as calcium citrate in the known manner.

An absolute pressure of about 1¼ inches of mercury is critical. If the evaporation is carried out at an absolute pressure of greater than 1¼ inches of mercury the anhydrous citric acid will crystallize out, and below 1¼ inches of mercury the hydrated citric acid will crystallize out. All vacuums are referred to a barometer reading of 30 inches.

Hydrated citric acid may be prepared on a commercial scale, both from the more or less pure, and the impure aqueous citric acid solution according to this invention.

What is claimed is:

1. In the evaporation of an aqueous citric acid solution, the process of varying the hydration of the product which consists in maintaining the absolute pressure of the evaporation below that of the atmosphere, and within ranges of pressure which do not include the transition point of 1¼ inches of mercury, while crystallizing citric acid.

2. The process of preparing hydrated citric acid comprising directly evaporating an aqueous citric acid solution at an absolute pressure of less than 1¼ inches of mercury, while crystallizing hydrated citric acid.

3. The process of preparing hydrated citric acid comprising directly evaporating in a vacuum pan an aqueous citric acid solution at an absolute pressure of less than 1¼ inches of mercury and a temperature of about 37° C., while crystallizing hydrated citric acid.

4. The process of preparing hydrated citric acid comprising directly evaporating in a vacuum pan an aqueous citric acid solution at an absolute pressure of less than 1¼ inches of mercury and a temperature of about 37° C. to about 50% crystallization of the contained citric acid, separating the crystals from the mother liquor, and reworking the mother liquor until substantially all the contained citric acid has crystallized.

5. The process of preparing pure hydrated citric acid from an impure aqueous citric acid solution comprising directly evaporating said solution at an asbolute pressure of less than 1¼ inches of mercury, while crystallizing hydrated citric acid.

6. The process of preparing pure hydrated citric acid from an impure aqueous citric acid solution comprising directly evaporating said solution in a vacuum pan at an absolute pressure of less than 1¼ inches of mercury and at temperature of about 37° C., while crystallizing hydrated citric acid.

7. The process of preparing pure hydrated citric acid from an impure aqueous citric acid solution comprising directly evaporating said solution in a vacuum pan at an absolute pressure of less than 1¼ inches of mercury and a temperature of about 37° C., while crystallizing hydrated citric acid to about 50% crystallization of the contained citric acid, separating the crystals from the mother liquor, and reworking the mother liquor.

8. The process of preparing pure hydrated citric acid from an impure aqueous citric acid solution containing about fifteen parts of citric acid to one part impurities, comprising directly evaporating said solution in a vacuum pan at an absolute pressure of less than 1¼ inches of mercury and a temperature of about 37° C., while crystallizing hydrated citric acid separating the crystals from the mother liquor, and reworking the mother liquor until about 75% of the contained citric acid has crystallized.

9. The process of preparing pure hydrated citric acid from an impure aqueous citric acid solution containing about twenty-five parts of citric acid to one part impurities, comprising directly evaporating said solution in a vacuum pan at an absolute pressure of less than 1¼ inches of mercury and a temperature of about 37° C., while crystallizing hydrated citric acid separating the crystals from the mother liquor, and reworking the mother liquor until about 85% of the contained citric acid has crystallized.

RICHARD PASTERNACK.
FRANCIS L. MEAD.
JOHN L. DAVENPORT.